(12) United States Patent
Haim et al.

(10) Patent No.: US 6,593,981 B1
(45) Date of Patent: Jul. 15, 2003

(54) MULTIGAP COLOR LCD DEVICE

(75) Inventors: Lee Haim, Glendale, AZ (US); Takao Unate, Kobe (JP); Masahiro Yoshiga, Kobe (JP); Kazuki Tamaoka, Kobe (JP)

(73) Assignee: Honeywell International Inc., Morristown, NJ (US)

( * ) Notice: Subject to any disclaimer, the term of this patent is extended or adjusted under 35 U.S.C. 154(b) by 286 days.

(21) Appl. No.: 09/628,838

(22) Filed: Jul. 31, 2000

(51) Int. Cl.[7] ............................................. G02F 1/1335
(52) U.S. Cl. ........................................ 349/106; 349/187
(58) Field of Search .......................................... 349/106

(56) References Cited

U.S. PATENT DOCUMENTS 5,299,041 A * 3/1994 Morin et al. ................ 349/106
5,402,141 A * 3/1995 Haim et al. .................... 345/88
5,566,013 A * 10/1996 Suzuki et al. ............... 349/155

* cited by examiner

*Primary Examiner*—Robert H. Kim
*Assistant Examiner*—P. R. Akkapeddi

(57) ABSTRACT

A multigap color LCD device which prevents display non-uniformity arising from non-uniformity in cell thickness. The external measurements of a blue color filter within a LCD device are fabricated not to overlap the source buses and the gate buses, which surround an opposing picture element electrode, and the external measurements of a green color filter in the LCD device are fabricated to overlap a pair of source buses and a pair of gate buses, which surround the opposing picture element electrode. The distance between the green color filter and both the source buses and the gate buses, is set so that it approximately equals the distance between the blue color filter and the picture element electrode. In addition to liquid crystal, spacers are inserted between the two substrates to maintain uniformity in cell thickness. Red color filters may be the same width as the blue color filters, or wider, extending to the proximity of the blue color filters.

21 Claims, 5 Drawing Sheets

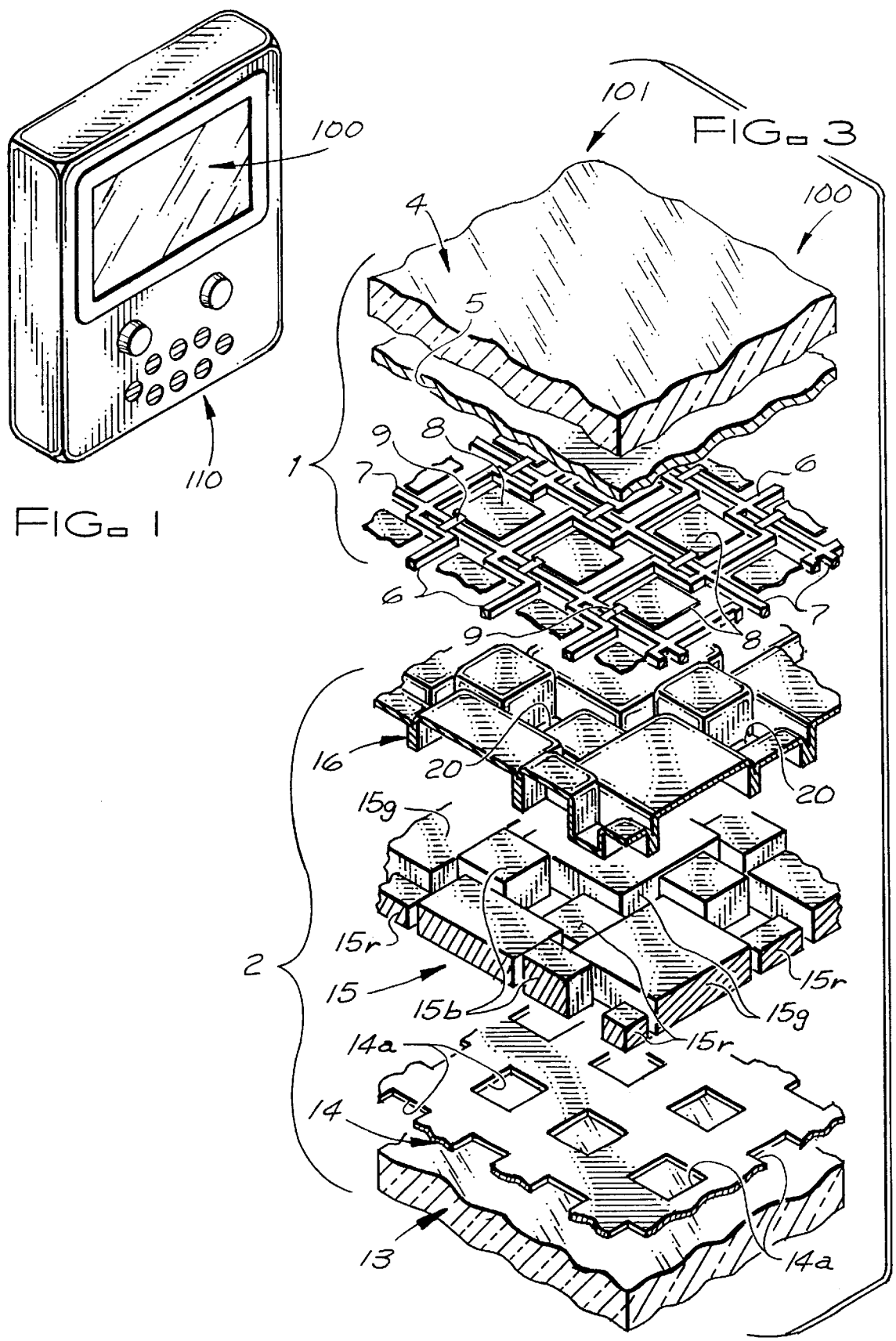

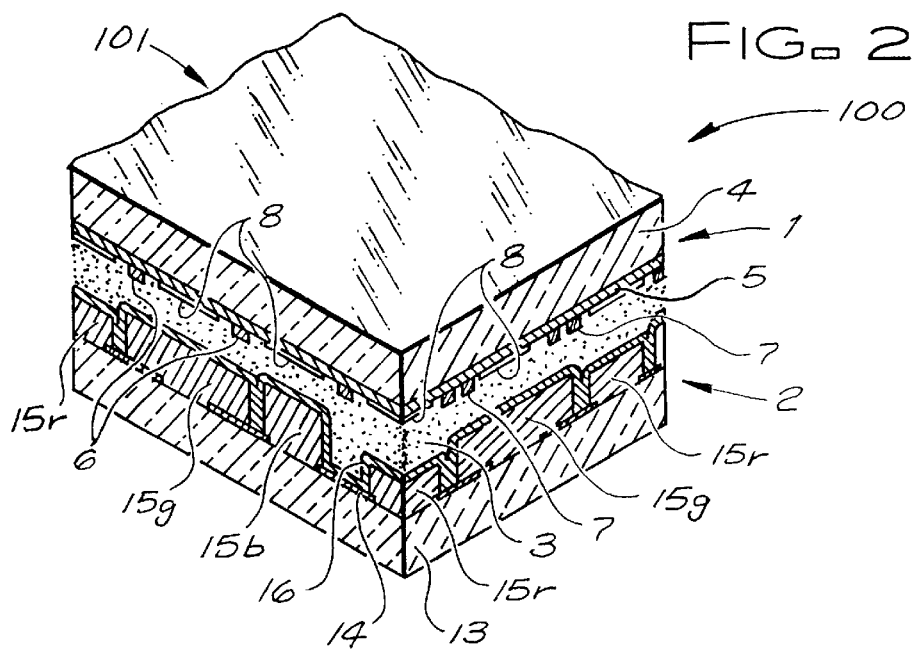
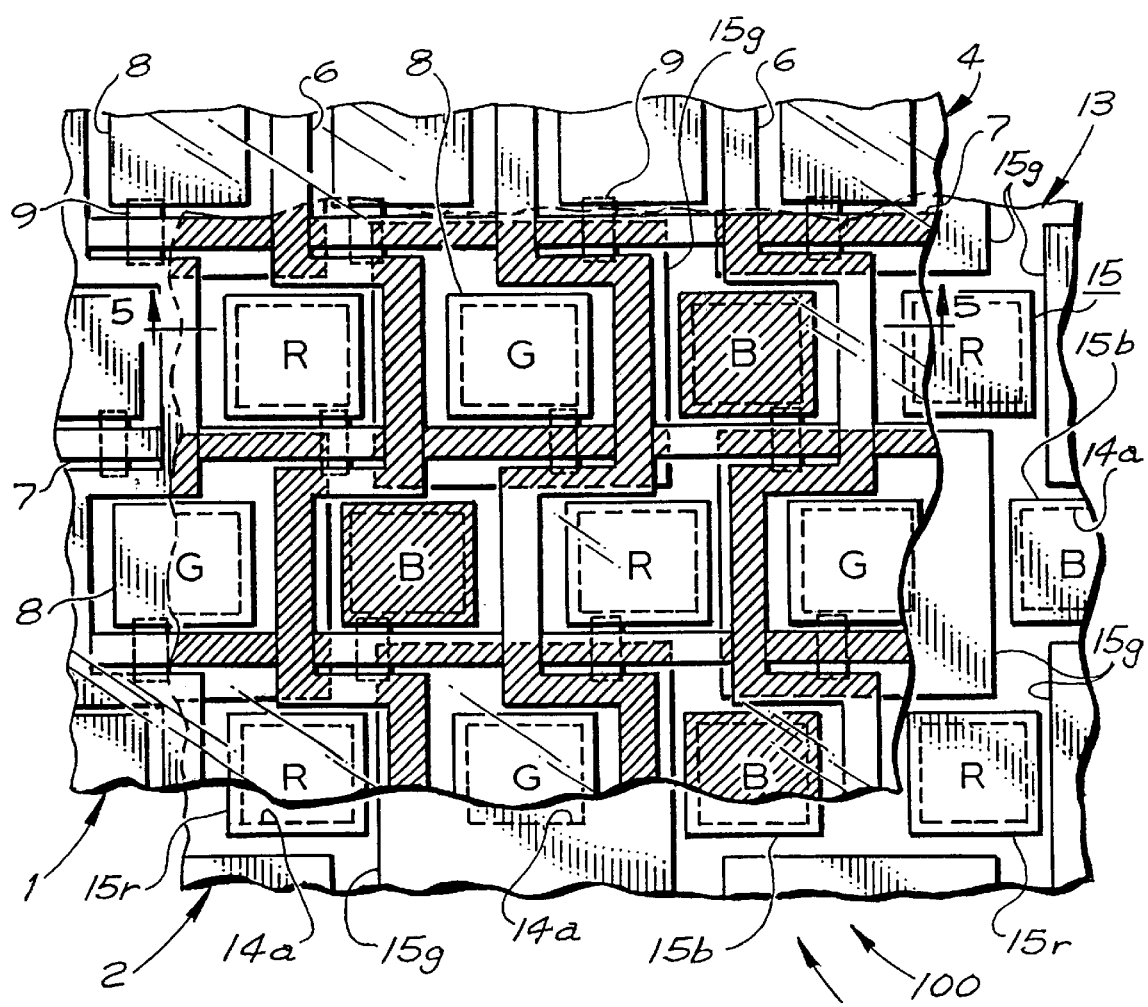

MULTIGAP COLOR LCD DEVICE

FIELD OF THE INVENTION

The present invention relates to liquid crystal display (LCD) devices, and more specifically, to the prevention or elimination of non-uniformity in a display due to the non-uniformity of the thickness of liquid crystal cells employed in color LCD devices.

BACKGROUND OF THE INVENTION

In a conventional (color) liquid crystal display device 120 (commonly referred to as an LCD device, LCD unit or sometimes just LCD), as is shown in FIGS. 8 and 9, an active matrix thin film transistor (TFT) array substrate 1 and a common electrode substrate 2 are disposed in close proximity to each other in an opposing manner. A liquid crystal layer 3 fills the space between them. On the TFT array substrate 1, source bus 6, which preferably forms vertical columns, and gate bus 7, which preferably forms horizontal lines, preferably intersect each other, forming a net-like meshed pattern. The protruding surfaces of the source bus 6 and the gate bus 7 (referred to hereafter as both buses) are preferably disposed approximately on the same plane. Picture element electrodes 8 within the meshes made by both buses are preferably formed to be considerably thinner than both buses, and a TFT 9 is preferably formed corresponding to the picture element electrode 8 on the periphery of each mesh (as also illustrated in FIG. 11).

When a gate voltage for scanning is applied to the gate bus 7, the TFT 9 is turned on, and the charge from the image signal applied to the source bus 6 is stored in the picture element capacity formed between the picture element electrode 8 and the common electrode 16 below.

As illustrated in FIGS. 8–12, in order to increase the conductivity of the source bus 6 of conventional liquid crystal display (LCD) device 120, the source bus 6 is preferably formed as a three-layer construction, and preferably, of indium tin oxide (ITO) 6a, molybdenum (Mo) 6b, and aluminum (Al) 6c. A protruding surface of source bus 6 is preferably formed approximately to the same height as a protruding surface of the gate bus 7. At the places where both buses 6 and 7 intersect, as is shown in FIG. 12, the source bus 6 is preferably made thin. In other words, a groove is cut in source bus 6. On top of source bus 6 is preferably formed an insulating film (SiNx) 11, and thereafter, the gate bus 7 is preferably formed in such a way that at points of intersection, the overall formation does not get particularly high or thick. Thus, as can be seen from FIG. 12, a gap is formed between both buses. Thus, buses 6 and 7 do not make electrical contact with each other where they cross or intersect.

Referring to FIG. 9, a black matrix 14 preferably forms a net-like pattern on a glass substrate 13 of a common electrode substrate 2. The net-like pattern (meshes) of black matrix 14 preferably opposes the meshes of TFT array substrate 1. In the meshes of the black matrix 14, red R, green G, and blue B color filters 15 are preferably formed, each filter being separated from adjacent filters by a gap. Common electrode 16 is preferably formed on the inner surface of the glass substrate 13 on which the color filters are formed. Common electrode 16 is preferably formed in such a way that it covers the entire surface.

There are various types of color filters known in the art for conventional CD device 120. Typically, for color filters 15, filters with differing thicknesses for R, G, B colors are preferably used. With color filters 15, the intensity of the transmitted light of the liquid crystal cells differs according to the R, G, and B wavelength. In order to compensate for this, the thicknesses for the each of the R, G, B color filters are preferably different. Typically, the thicknesses t for the color filters R, G, and B, identified as tr, tg, and tb (as seen in FIG. 9), are preferably such that tb>tg>tr. As a result, an LCD device which employs these filters has liquid crystal cells, each cell varying in thicknesses due to the use of R, G, and B filters. The formation of filters with different thicknesses within an LCD device is known as multigap construction.

In conventional LCD devices 120, display non-uniformity results from, among other factors, non-uniformity in the thicknesses of the liquid crystal cells. When display non-uniformity occurs, visibility diminishes. For this reason, before the two substrates 1 and 2 are joined together in the LCD, granular spacers (not shown) with the same diameter are preferably spread uniformly on the TFT array substrate 1 and the common electrode substrate 2. Thereafter substrates 1 and 2 are joined together and the liquid crystal is inserted. The thickness of the cells is determined by the spacers employed.

However, with a multigap color LCD (which has color filters, preferably R, G and B, of varying thickness which are not equal to each other), the uniformly spread spacers do not function effectively in properly setting the thickness of all the liquid crystal cells. For example, referring to FIGS. 11 and 12, on the common electrode substrate 2, a blue color filter 15b is formed thicker than a red color filter 15r, and a green color filter 15g, with the top of the blue color filter 15b protruding the most. As a result, in the regions where the blue color filter 15b overlaps with both buses 6 and 7, namely, the shaded areas in FIG. 8, the distance between the formations on substrates 1 and 2 (referred to as cell thickness d), is thinnest, and both glass substrates 1 and 2 are supported only by the spacers spread in this region. As those of skill in the art of conventional LCD devices 120 will recognize, the shaded regions as illustrated in FIG. 8 depict the portions where the spacers are effective to prevent display non-uniformity, yet make up only a small portion of the surface area of substrates 1 and 2. Because spacers have a tendency to move, if this effective region is small, the cell thickness is not always stable. In this situation, non-uniformity in cell thickness occurs, thereby causing non-uniformity in display. Accordingly, it is one of the objects of the present invention to make the effective region of spacers within the liquid crystal larger, keep cell thickness stable, eliminate non-uniformity of cell thickness and prevent non-uniformity of the color LCD display.

BRIEF SUMMARY OF THE INVENTION

The following summary of the invention is provided to facilitate an understanding of some of the innovative features unique to the present invention, and is not intended to be a full description. A full appreciation of the various aspects of the invention can only be gained by considering the entire specification, claims, and drawings, as a whole.

The present invention is a multigap liquid crystal display having a thin film transistor (TFT) array substrate and a common electrode substrate formed together. The tallest color filters (preferably blue color filters) are formed so that their surface area does not overlap the source bus and the gate bus surrounding the opposing picture element electrodes above. In addition, the shorter (preferably green) color filters are formed to overlap the source bus and the gate bus surrounding the opposing picture element electrodes above. Furthermore, the film thickness of the source bus, the gate bus, the taller (preferably blue) color filter thickness tb and the shorter (preferably green) color filter thickness tg are set so that the distance between the shorter (preferably green) color filters and both buses is set approximately equal to the distance between the taller (preferably blue) color filters and the picture element electrodes.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The accompanying figures, in which like reference numerals refer to essentially identical or functionally-similar elements throughout the separate views and which are incorporated in and form part of the specification, further illustrate the preferred embodiments of the present invention and, together with the detailed description of the invention, serve to explain the principles of the present invention.

FIG. 1 is an isometric view of the multigap color LCD device 100 installed in a video game toy 110.

FIG. 2 is an isometric view of a section of the multigap color LCD device 100 showing the various layers and how they fit together.

FIG. 3 is an exploded isometric view of a section of the multigap color LCD device 100 showing the various layers and how they fit together.

FIG. 4 is a plan view of one embodiment (the equal-width picture element embodiment 101) of the present invention (multigap color LCD device 100) depicting, among other items, a plurality of color filters (generally identified by reference number 15), a source bus 6, a black matrix opening 14a, a picture element electrode 8 and a gate bus 7.

DETAILED DESCRIPTION OF THE PREFERRED EMBODIMENTS

Figure 5:
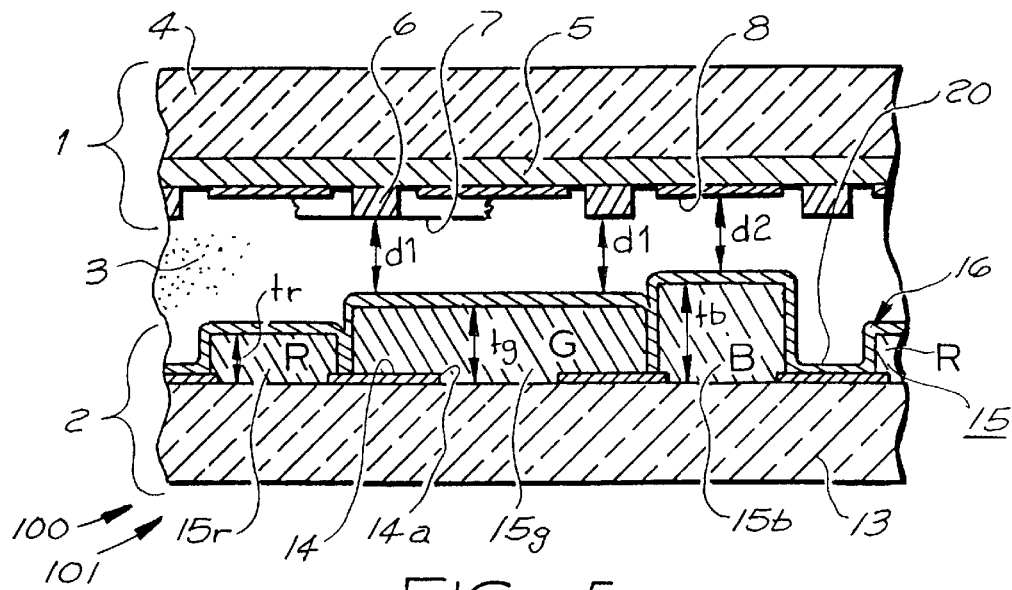
FIG. 5 is a cross sectional view of a portion of FIG. 4 taken along lines 2—2, depicting, among other items, a TFT array substrate 1, a glass substrate 4, a source bus 6, a SiO2 layer 5, a depression 20, a common electrode 16, a plurality of color filters (generally, 15), a glass substrate 13, a black matrix 14, a common electrode substrate 2 and a liquid crystal layer 3.
Figure 6:
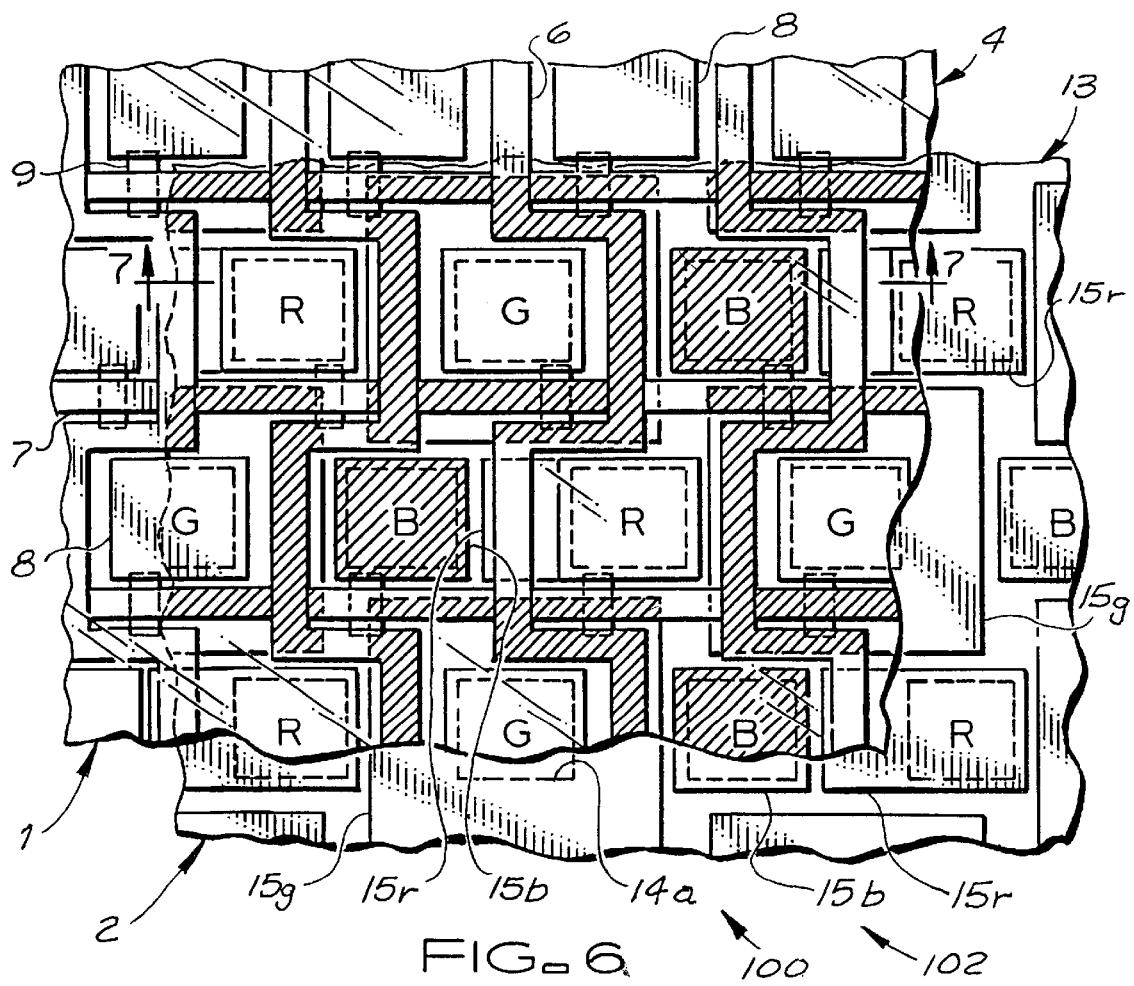
FIG. 6 is a plan view of another embodiment of the present invention (the depressionless embodiment 102), depicting, among other items, a source bus 6, a black matrix opening 14a, a picture element electrode 8 and a gate bus 7.

FIG. 1 illustrates a multigap color LCD device 100 installed in a video device, (such as for example, game toy 110). Use in a video game toy 110 is just one of many potential applications for multigap color LCD device 100.

Referring generally to all figures, the present invention (multigap color LCD device 100) relates to a liquid crystal display unit preferably formed by traditional multigap formation process (such as, for example, the process of manufactring a color LCD device) so that non-uniformity in a display is significantly reduced or prevented in such LCD devices. In addition, the present invention is directed towards a multigap color liquid crystal display device 100 having a thin film transistor (TFT) array substrate 1 and a common electrode substrate 2. In conventional multigap liquid crystal display units 120, as shown in FIGS. 8–12, the TFT array substrate 1 includes a source bus 6 and a gate bus 7 formed on the TFT array substrate 1, the source bus 6 and the gate bus 7 intersecting to form a net or mesh-like pattern. In this fashion, both the source and the gate buses (6 and 7) are typically disposed approximately on a single plane, with picture element electrodes 8 being formed within the mesh-like pattern. The picture element electrodes 8 are generally thinner than both the source and the gate buses (6 and 7). Thin film transistors 18 corresponding to the picture element electrodes 8 are then formed on the periphery of each mesh pattern (see FIG. 11). Many thin film transistors 18 collectively comprise TFT array substrate 1. In other words, the TFT array substrate 1, preferably comprises a plurality of thin film transistors 18, each transistor corresponding to each picture element electrode 8, the thin film transistors 18 being formed on the periphery of the mesh pattern.

Figure 9:
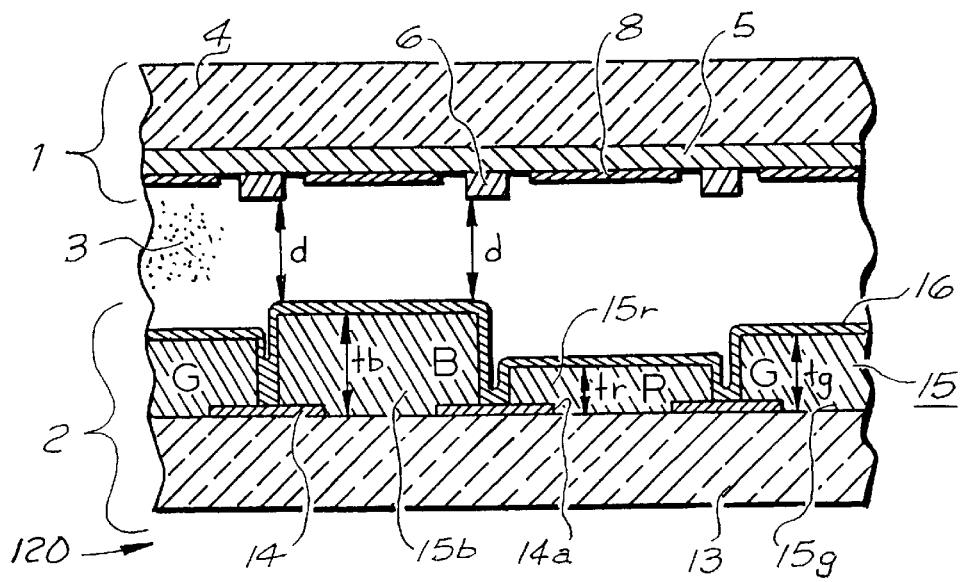
FIG. 9 is a cross sectional view of a portion of FIG. 8 taken along lines 6—6, depicting, among other items, a TFT array substrate 1, a glass substrate 4, a SiO2 layer 5, a source bus 6, a common electrode 16, a plurality of color filters (generally, 15), a glass substrate 13, a black matrix 14, a common electrode substrate 2 and a liquid crystal layer 3.
Figure 10:
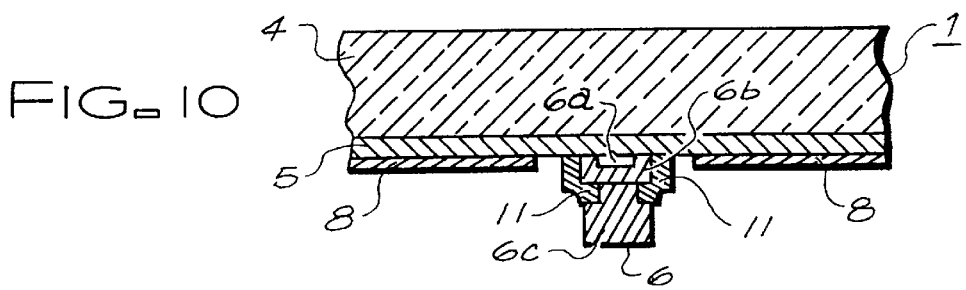
FIG. 10 is a cross sectional view of a portion of FIG. 8 taken along lines 7—7, depicting, among other items, source bus 6, picture element electrode (ITO) 8, SiO2 layer 5, glass substrate 4 and TFT array substrate 1
Figure 11:
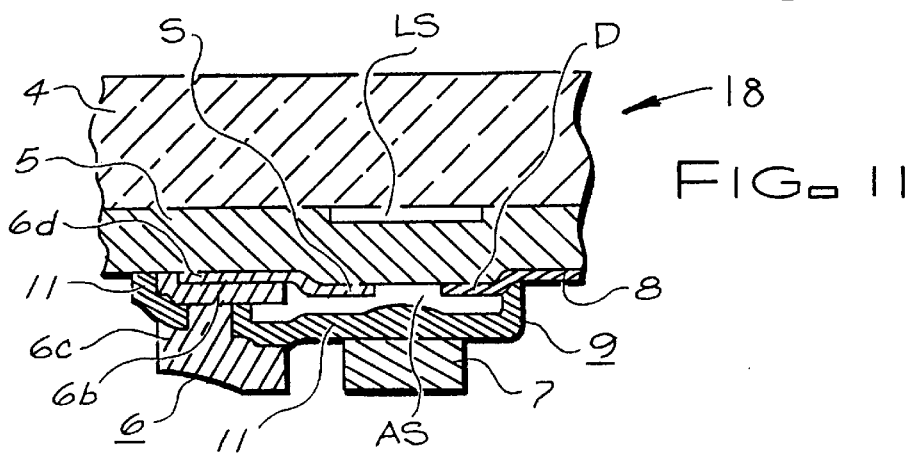
FIG. 11 is a cross sectional view of a portion of FIG. 8 taken along lines 8—8, depicting, among other items, gate bus 7, SiNx insulating layer 11, source bus 6, SiO2 layer 5, and picture element electrode 8.
Figure 12:
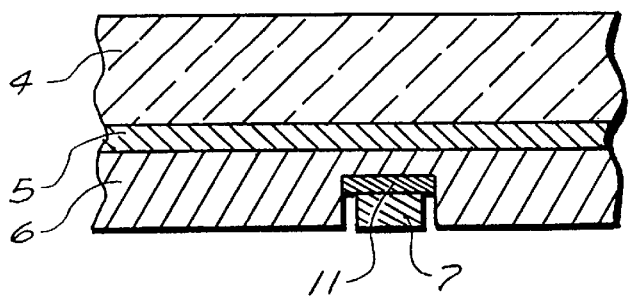
FIG. 12 is a cross sectional view of a portion of FIG. 8 taken along lines 9—9, depicting, among other items, gate bus 7, SiNx insulating layer 11, source bus 6, SiO2 layer 5, and glass substrate 4.

Still referring to conventional multigap liquid crystal display units 120, as shown in FIGS. 8–12, The common electrode substrate 2 generally includes a glass substrate 13 and a black matrix 14 made of thin film. Typically, the black matrix 14 forms a net-like pattern corresponding to the meshes of the TFT array substrate 1. Within the black matrix 14 meshes are preferably formed a plurality of red, green and blue color filters (15r, 15g, and 15b respectively, or collectively color filters 15) having a thickness tr, tg and tb respectively (as shown in FIGS. 5 and 9), each color filter 15 being separated from one another. Furthermore, each color filter 15 has a corresponding surface area (i.e., red color filter 15r surface area, green color filter 15g surface area and blue color filter 15b surface area). The thicknesses and the surface area of each color filter 15: tr, tg, and tb, are preferably such that tr<tg<tb. The common electrode 16 on the inner substrate of the glass substrate 13 on which these color filters 15 are formed is preferably formed such that it covers the entire surface.

When the TFT array substrate 1 and common electrode substrate 2 are formed together, both are preferably separated by a plurality of spacers so that the TFT array substrate 1 and the common electrode substrate 2 are disposed in close proximity to each other in an opposing manner with liquid crystal (liquid crystal layer 3) filling the space between the substrates (1 and 2).

Figure 7:
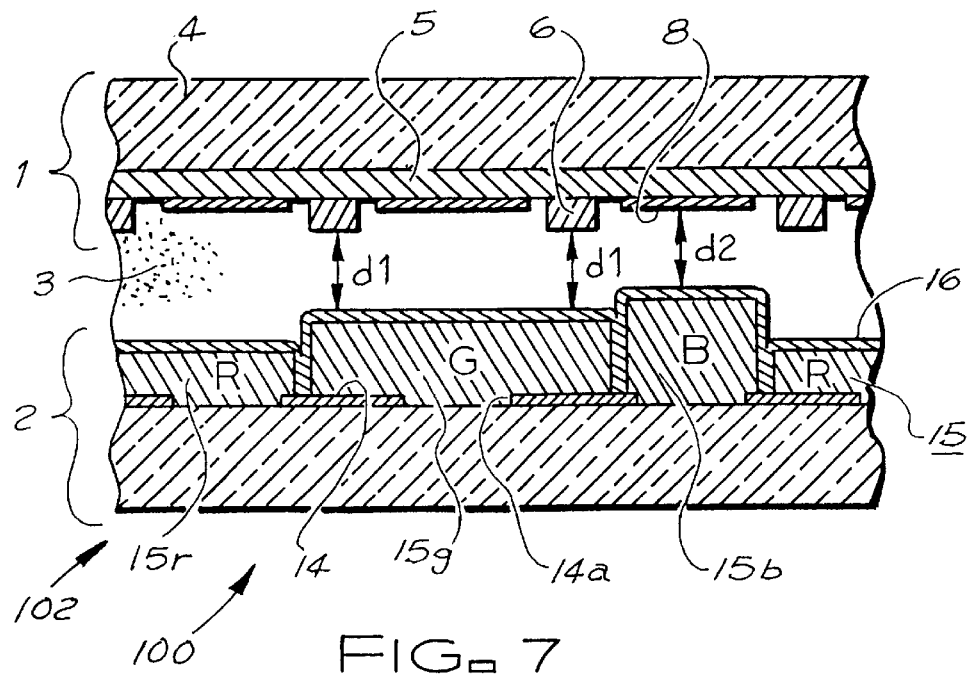
FIG. 7 is a cross sectional view of a portion of FIG. 6 taken along lines 4—4, depicting, among other items, a TFT array substrate 1, a glass substrate 4, a SiO2 layer 5, a source bus 6, a common electrode 16, a plurality of color filters (generally, 15), a black matrix 14, a common electrode substrate 2 and a liquid crystal layer 3.
Figure 8:
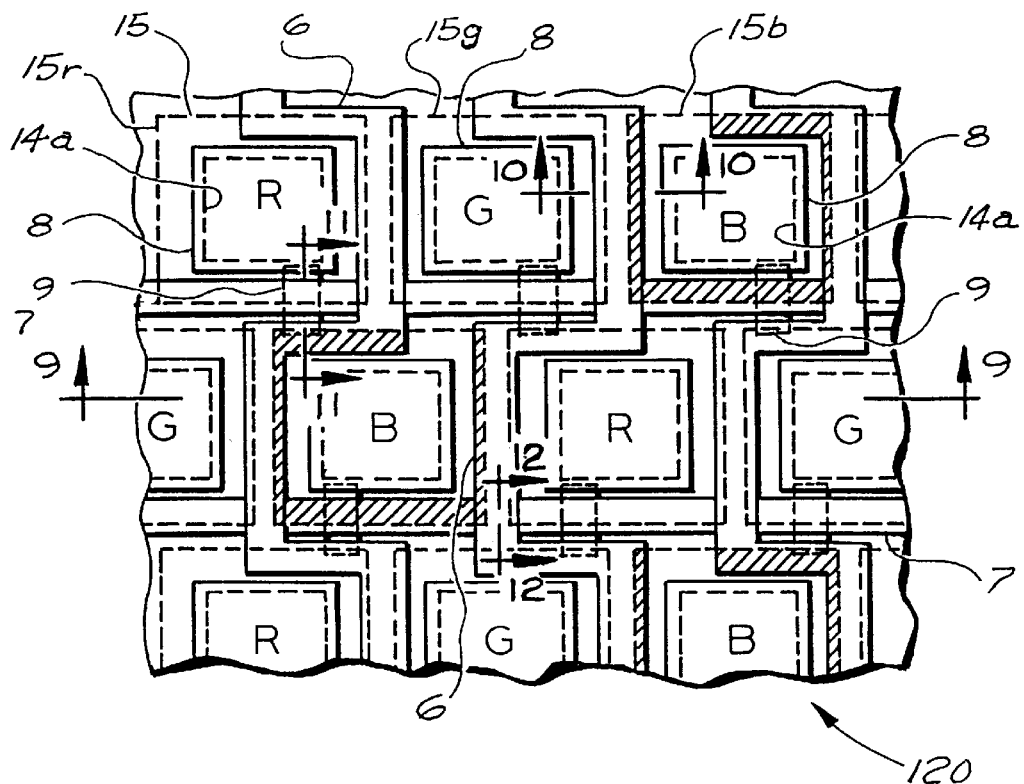
FIG. 8 is a plan view of a conventional liquid crystal display (LCD) device 120.

Referring generally to FIGS. 2–7, The present invention, multigap color LCD device 100, provides for forming each tallest (preferably blue) color filter 15b so that its surface area does not overlap the source bus 6 and the gate bus 7 surrounding the opposing picture element electrodes 8. In addition, forming each shorter (preferably middle sized where three colors are provided) (preferably green) color filter 15g to overlap the source bus 6 and the gate bus 7 surrounding the opposing picture element electrodes 8. The distance between the opposing shorter (preferably green) color filters 15g and both buses (6 and 7) is set at d1 (as shown in FIGS. 5 and 7) and the distance d2 between the opposing taller (preferably blue) color filters 15b and the picture element electrodes 8, are approximately equal (d1 is approximately equal to d2). This is preferably accomplished by selecting the film thickness of the source bus 6, the gate bus 7, the taller (preferably blue) color filter 15b thickness tb and the shorter (preferably green) color filter 15g thickness tg so that d1 is approximately equal to d2. The film thickness of the source bus 6, is preferably approximately equal to the thickness of the gate bus 7.

FIGS. 2 and 3 are isometric views of a section of the equal-width picture element embodiment 101 of multigap color LCD device 100 showing the various layers and how they fit together. FIG. 3 is an exploded view. FIGS. 2 and 3 can be viewed in conjunction with the remaining figures described below (particularly FIGS. 4 and 5 which depict equal-width picture element embodiment 101) whenever an isometric view helps to show the multigap color LCD device 100.

In the equal-width picture element embodiment 101 of multigap color LCD device 100, and referring to FIGS. 4 and 5, a taller (preferably blue) color filter 15b is formed such that it does not overlap either buses 6 or 7 surrounding the opposing picture element electrode 8. In other words, the taller color filters 15b are small in width such that when viewed from a location perpendicular to the common electrode substrate 2, the taller color filters 15b do not overlap the buses 6 or 7 surrounding the opposing picture element electrodes 8. Furthermore, the a shorter (preferably green) color filter 15g is formed large (wide) such that it does overlap the pair of source buses 6 or the pair of gate buses 7 surrounding the opposing picture element electrode 8. In other words, the shorter color filters 15g are wide such that when viewed from a location perpendicular to the common electrode substrate 2, the shorter color filters 15g overlap buses 6 and 7 surrounding the opposing picture element electrodes 8. Thus, in the equal-width picture element embodiment 101 of the multigap color LCD device 100, the distance between the opposing shorter (preferably green) color filter 15g and both buses 6 and 7 is set to a distance di while the distance between the opposing taller (preferably blue) color filter 15b and picture element electrode 8 is set to a distance d2 so that d1 is approximately equal to d2. This is accomplished by selecting the film thickness of both buses 6 and 7, as well as taller (preferably blue) color filter thickness tb and shorter (preferably green) color filter thickness tg, such that d1 is approximately equal to d2. In other words, the film thickness of buses 6 and 7, taller color filter 15b thickness tb, and the shorter color filter 15g thickness tg are selected such that the distance d1 between opposing shorter color filters 15g and buses 6 and 7 is approximately equal to the distance d2 between the opposing taller color filters 15b and the picture element electrodes 8.

As mentioned previously, the regions where the cell thickness is the smallest, and thus where the spacers are effective, are the shaded regions in FIG. 4. This region corresponds to a first region where shorter (preferably green) color filter 15g and both buses 6 and 7 overlap and a second region where taller (preferably blue) color filter 15b and picture element electrode 8 overlap. However, because the thickness of picture element electrode 8 is sufficiently small in comparison to distance d2, the second region may simply be referred to as the region where the taller (preferably blue) color filter 15b is present. It can be seen that the first and second regions (as seen in FIG. 4, for example) are much larger than the shaded effective areas in the conventional technology illustrated in FIG. 6.

In the equal-width picture element embodiment 101 of the multigap color LCD device 100, the shortest (preferably red) color filter 15r (as illustrated, for example, in FIG. 5) is formed to have approximately the same external measurements (except for height) as the taller (preferably blue) color filter 15b. These dimensions that are the same are herein called width, and are essentially the two axes that are parallel to the plane of common electrode substrate 2. By forming the external width measurements of the shortest (preferably red) color filter 15r to be approximately equal to the external measurements of the taller (preferably blue) color filter 15b, there is no need to prepare a mask for the shortest (preferably red) color filter 15r because the mask used in the manufacturing process for taller (preferably blue) color filter 15b may be used. This results in cost savings as well as providing higher manufacturing efficiency.

It should be noted that when the external width measurements (width) of the shortest (preferably red) color filter 15r are made to be approximately equal to the external width measurements of taller (preferably blue) color filter 15b, as in the equal-width picture element embodiment 101, a depression 20, (as shown in FIG. 5) which is relatively large, appears on the black matrix 14 in the space between the shortest (preferably red) color filter 15r and the taller (preferably blue) color filter 15b. When the spacers are spread uniformly between the TFT array substrate 1 and the common electrode substrate 2, the spacers can easily move and pile up within this depression 20. If the spacers pile up in the depression 20, display non-uniformity may result. Thus, in another embodiment of the multigap color LCD device 100 (depressionless embodiment 102 as illustrated in FIG. 7) the shortest (preferably red) color filter 15r is formed to extend to the proximity of the taller (preferably blue) color filter 15b such that depression 20 is not formed. As a result, the shortest (preferably red) color filter 15r is formed close not just to the shorter (preferably green) color filter 15g, but to the taller (preferably blue) color filter 15b, while the surface area of the shortest (preferably red) color filter 15r is formed larger than the surface area of the taller (preferably blue) color filter 15b. As those of skill in the art will now realize, the formation of a color LCD device in this fashion (depressionless embodiment 102) will significantly prevent or eliminate non-uniformity in the finished display device.

Those of skill in the art will also now realize and come to appreciate that, according to the various embodiments of the present disclosure of multigap color LCD device 100, the external measurements of taller (preferably blue) color filter 15b are preferably set such that it does not overlap the source bus 6 and gate bus 7, which surround opposing picture element electrode 8, and that the external measurements of the shorter (preferably green) color filter 15g are set such that the shorter (preferably green) color filter 15g overlaps the pair of source buses 6 and the pair of gate buses 7 (which surround opposing display electrode 8). The distance d1 between the shorter (preferably green) color filter 15g and both buses 6 and 7, and the distance d2 between the taller (preferably blue) color filter 15b and the picture element electrode 8, are preferably set so that they are approximately equal. Thus, corresponding to d1 and d2, the regions where the cell thickness is thinnest and the spacers are effective are considerably larger than in the conventional technology (conventional LCD device 120). The spacers distributed in these effective regions also support the TFT array substrate 1 and common electrode substrate 2 in a much more stable manner than with the conventional technology, thus significantly reducing or completely preventing display non-uniformity which arises from non-uniformity in cell thickness.

Other variations and modifications of the present invention will be apparent to those of ordinary skill in the art, and it is the intent of the appended claims that such variations and modifications be covered. The particular values and configurations discussed above can be varied, are cited to illustrate particular embodiments of the present invention, and are not intended to limit the scope of the invention.

What is claimed is:

1. A multigap liquid crystal display device comprising in combination:
   a) a thin film transistor (TFT) array substrate opposing a common electrode substrate, said TFT array substrate including a source bus and a gate bus formed on said TFT array substrate, said source bus and said gate bus intersecting to form a mesh pattern;
   b) said source bus and said gate bus being formed approximately on a single plane, and said mesh pattern forming picture element electrodes which are thinner than said source bus or said gate bus;
   c) said common electrode substrate comprising a black matrix made of thin film forming a net-like pattern on the inner surface of a glass substrate corresponding to said mesh pattern of said TFT array substrate;
   d) red, green and blue color filters formed in said black matrix in said net-like pattern; and
   e) the film thicknesses of said source bus, said gate bus, said blue color filters (tb), and said green color filters (tg) being such that the distance (d1) between opposing said green color filters an both said source bus and said gate bus is approximately equal to the distance (d2) between the opposing said blue color filters and said picture element electrodes.

2. The multigap liquid crystal display according to claim 1 further comprising a plurality of thin film transistors, one thin film transistor corresponding to each said picture element electrode, said thin film transistors being formed on the periphery of said mesh pattern.

3. The multigap liquid crystal display device according to claim 1, the thickness of said red color filters (tr), the thickness of said green color filter (tg), and the thickness of said blue color filter (tb) being such that tr<tg<tb.

4. The multigap liquid crystal display device according to claim 1, said common electrode substrate covering the red, green, and blue color filters over the entire surface area of said glass substrate on which said red, green, and blue color filters are formed.

5. The multigap liquid crystal display device according to claim 1, said TFT array substrate and said common electrode substrate being separated by spacers and disposed in close proximity to each other in an opposing manner, comprising liquid crystal substantially filling the space between said TFT array substrate and said common electrode substrate.

6. The multigap liquid crystal display device according to claim 1:
   a) said blue color filters being small enough that they do not overlap either said source bus or said gate bus surrounding opposing said picture element electrodes; and
   b) said green color filters being large enough that they overlap the pairs of source buses and the pairs of gate buses surrounding the opposing picture element electrodes.

7. The multigap liquid crystal display device according to claim 1, the width of said red color filters being essentially equal to the width of said blue color filters.

8. The multigap liquid crystal display device according to claim 7:
   a) a plurality of thin film transistors, one thin film transistor corresponding to each said picture element electrode being formed on the periphery of said mesh pattern;
   b) the thickness of said red color filters (tr), the thickness of said green color filter (tg), and the thickness of said blue color filter (tb) being such that tr<tg<tb;
   c) said common electrode substrate covering the red, green, and blue color filters over essentially the entire surface area of said glass substrate on which said red, green, and blue color filters are formed;
   d) said TFT array substrate and said common electrode substrate being separated by spacers and disposed in close proximity to each other in an opposing manner, with liquid crystal filling the space between said TFT array substrate and said common electrode substrate; and
   e) said blue color filters being small enough in width that they do not overlap either said source bus or said gate bus surrounding opposing said picture element electrodes; and
   f) said green color filters being large enough in width that they overlap the pairs of source buses and the pairs of gate buses surrounding the opposing picture element electrodes.

9. The multigap liquid crystal display device according to claim 1, said red color filters being formed in close proximity to said blue color filters and to said green color filters, the width of said red color filters being larger than the width of said blue color filters.

10. The multigap liquid crystal display device according to claim 9:
   a) a plurality of thin film transistors, one thin film transistor corresponding to each said picture element electrode being formed on the periphery of said mesh pattern;
   b) the thickness of said red color filters (tr), the thickness of said green color filter (tg), and the thickness of said blue color filter (tb) being such that tr<tg<tb;
   c) said common electrode substrate covering the red, green, and blue color filters over the entire surface area of said glass substrate on which said red, green, and blue color filters are formed;

d) said TFT array substrate and said common electrode substrate being separated by spacers and disposed in close proximity to each other in an opposing manner, with liquid crystal filling the space between said TFT array substrate and said common electrode substrate;

e) said blue color filters being small enough in width that said blue color filters do not overlap either said source bus or said gate bus surrounding opposing said picture element electrodes; and f) said green color filters being large enough in width that said green color filters overlap the pairs of source buses and the pairs of gate buses surrounding the opposing picture element electrodes.

11. A liquid crystal display device comprising in combination:

a) a thin film transistor (TFT) array substrate comprising a plurality of buses;

b) picture element electrodes formed on said TFT array substrate between said buses;

c) a common electrode substrate disposed in close proximity to said TFT array substrate, on which said common electrode substrate are formed a plurality of color filters comprising at least 2 different colors including a plurality of first color filters and a plurality of second color filters;

d) said first color filters being small in width such that when viewed from a location perpendicular to said common electrode substrate, said first color filters do not overlap said buses surrounding the opposing said picture element electrodes; and e) said second color filters being wide such that when viewed from a location perpendicular to said common electrode substrate, said second color filters overlap said buses surrounding the opposing said picture element electrodes.

12. The device according to claim 11, the film thickness of said buses, the thickness of said first color filters, and the thickness of said second color filters being selected such that the distance between opposing said second color filters and said buses is approximately equal to the distance between the opposing said first color filters and said picture element electrodes.

13. The multigap liquid crystal display device according to claim 12, said TFT array substrate and said common electrode substrate being separated by spacers, with liquid crystal filling the space between said TFT array substrate and said common electrode substrate.

14. The device according to claim 13:

a) said buses comprising source buses and gate buses;

b) said source buses and said gate buses being disposed approximately on a single plane and intersecting each other forming a net-like pattern of meshes; and c) further comprising thin film transistors.

15. The device according to claim 14:

a) said first color filters comprising blue color filters; and b) said second color filters comprising green color filters.

16. The device according to claim 15:

a) said color filters further comprising red color filters;

b) the thickness of said red color filters being less than the thickness of said green color filters; and c) the thickness of said green color filters being less than the thickness of said blue color filters.

17. The device of claim 16, each said red color filter having a width approximately equal to the width of each said blue color filter.

18. The device of claim 17, each said red color filter having a width that is larger than the width of each said blue color filter.

19. The device of claim 18, each said red color filter extending to the proximity of the adjacent said blue color filter.

20. A method of reducing display non-uniformity in a multigap liquid crystal display of the type having: a thin film transistor (TFT) array substrate including a plurality of buses and a plurality of picture element electrodes, and a common electrode substrate disposed in close proximity to the TFT array substrate, the common electrode substrate having a plurality of first color filters, and a plurality of second color filters; said method comprising the steps of:

a) selecting the width of the first color filters to be small enough that the first color filters do not overlap the buses;

b) selecting the width of the second color filters to be large enough that the second color filters overlap the buses;

c) selecting the film thickness of the buses, the thickness of the first color filters, and the thickness of the second color filters such that the distance between opposing second color filters and the buses is approximately equal to the distance between the opposing first color filters and the picture element electrodes; and d) installing spacers between the TFT array substrate and the common electrode substrate.

21. The method according to claim 20:

a) said multigap liquid crystal display further comprising a plurality of third color filters; and b) said method further comprising the step of selecting the width of the third color filters such that the third color filters each extend to the proximity of the adjacent first color filter.

* * * * *